United States Patent
Cope et al.

(10) Patent No.: US 11,689,808 B2
(45) Date of Patent: *Jun. 27, 2023

(54) IMAGE SYNTHESIS SYSTEM

(71) Applicant: Spookfish Innovations PTY LTD, Bentley (AU)

(72) Inventors: Simon Cope, Burswood (AU); Peter Kovesi, Shenton Park (AU); Jianzhong Xiao, South Perth (AU)

(73) Assignee: Spookfish Innovations PTY LTD, Bentley (AU)

( * ) Notice: Subject to any disclaimer, the term of this patent is extended or adjusted under 35 U.S.C. 154(b) by 45 days.

This patent is subject to a terminal disclaimer.

(21) Appl. No.: 17/366,709

(22) Filed: Jul. 2, 2021

(65) Prior Publication Data

US 2021/0385381 A1 Dec. 9, 2021

Related U.S. Application Data

(63) Continuation of application No. 16/343,610, filed as application No. PCT/AU2017/051143 on Oct. 20, 2017, now Pat. No. 11,057,566.

(30) Foreign Application Priority Data

Oct. 20, 2016 (AU) ............................... 2016904256

(51) Int. Cl.
 *H04N 23/68* (2023.01)
 *H04N 25/53* (2023.01)

(52) U.S. Cl.
 CPC ....... *H04N 23/6812* (2023.01); *H04N 23/683* (2023.01); *H04N 25/53* (2023.01)

(58) Field of Classification Search
 CPC ........... H04N 5/23258; H04N 5/23267; H04N 5/353; H04N 5/3532
 See application file for complete search history.

(56) References Cited

U.S. PATENT DOCUMENTS

| | | | | |
|---|---|---|---|---|
| 11,057,566 B2 * | 7/2021 | Cope | .................... | H04N 25/531 |
| 2010/0309340 A1 * | 12/2010 | Border | .................. | H04N 25/53 348/241 |

(Continued)

FOREIGN PATENT DOCUMENTS

| | | |
|---|---|---|
| GB | 2483224 | 3/2012 |
| WO | WO 2014/093517 | 6/2014 |

(Continued)

OTHER PUBLICATIONS

IP Australia; Examination Report No. 1 regarding Australian App. No. 2017344761, dated Sep. 14, 2021.

(Continued)

*Primary Examiner* — Lin Ye
*Assistant Examiner* — John H Morehead, III
(74) *Attorney, Agent, or Firm* — Dunlap Codding, P.C.

(57) ABSTRACT

Image synthesis system are disclosed for synthesizing a global shutter image based on a rolling shutter image. The rolling shutter image is captured by an aerial camera system having at least one rolling shutter camera and the rolling shutter image has a plurality of scanlines, the scanlines having associated different position and pose information. The image synthesis system is arranged to project a rolling shutter image captured by a rolling shutter camera to object space, such as by projecting each scanline of the rolling shutter image using position and pose information associated with the scanline, and subsequently from object space to a synthetic global shutter image.

20 Claims, 5 Drawing Sheets

(56) References Cited

U.S. PATENT DOCUMENTS

| | | | |
|---|---|---|---|
| 2012/0120291 A1* | 5/2012 | Shiohara | H04N 23/75 348/296 |
| 2013/0021474 A1* | 1/2013 | Taylor | H04N 5/33 348/E7.085 |
| 2013/0113967 A1* | 5/2013 | Wang | G06K 7/10722 348/E5.091 |
| 2013/0335592 A1 | 12/2013 | Yamada et al. | |
| 2014/0226047 A1* | 8/2014 | Lahav | H04N 25/771 348/296 |
| 2015/0009345 A1* | 1/2015 | Tsubaki | H04N 23/6812 348/208.2 |
| 2015/0367958 A1* | 12/2015 | Lapstun | G01C 11/025 348/144 |
| 2016/0122038 A1* | 5/2016 | Fleischman | G06T 7/73 244/114 R |
| 2016/0150142 A1* | 5/2016 | Lapstun | G03B 17/561 348/36 |
| 2016/0165140 A1 | 6/2016 | Mourikis et al. | |
| 2016/0180510 A1* | 6/2016 | Grau | G06T 7/85 348/46 |
| 2016/0227138 A1* | 8/2016 | Kozlowski | H04N 25/77 |
| 2016/0323518 A1* | 11/2016 | Rivard | H04N 23/74 |
| 2016/0342874 A1* | 11/2016 | Powell | G06K 7/10722 |

FOREIGN PATENT DOCUMENTS

| | | |
|---|---|---|
| WO | WO 2014/171988 A2 | 10/2014 |
| WO | WO 2016/054681 | 4/2016 |

OTHER PUBLICATIONS

Spookfish Innovations Pty Ltd; Response to Apr. 1, 2021 European Examination Report from the European Patent Office Regarding European App. No. 17863045.5, dated May 24, 2021.

Intellectual Property India; First Examination Report regarding India Patent App. No. 201917015758, dated Dec. 3, 2021.

International Searching Authority/Australian Patent Office; PCT International Search Report and Written Opinion regarding International App. No. PCT/AU2017/051143 dated Dec. 21, 2017.

International Searching Authority/Australian Patent Office; PCT International Preliminary Report on Patentability regarding International App. No. PCT/AU2017/051143 dated Feb. 6, 2019.

International Searching Authority/Australian Patent Office; PCT Written Opinion of the International Preliminary Examining Authority regarding International App. No. PCT/AU2017/051143 dated Oct. 18, 2018.

Klinger, B. et al., "Street View' Motion-from-Structure-from-Motion", 2013 IEEE International Conference on Computer Vision (ICCV), Dec. 1-8, 2013, pp. 953-960.

Saurer, O. et al., "Rolling Shutter Stereo", 2013 IEEE International Conference on Computer Vision (ICCV), Dec. 1-8, 2013, pp. 465-472.

Hedborg, J. et al., "Rolling Shutter Bundle Adjustment", 2012 IEEE Conference on Computer Vision and Pattern Recognition (CVPR), Jun. 16-21, 2012.

Ringaby, E. et al., "Efficient Video Rectification and Stabilisation for Cell-Phones", International Journal of Computer Vision, Feb. 2012, vol. 96, Issue 3, pp. 335-352.

Li, R. et al., "Integration of orbital and ground images for enhanced topographic mapping in Mars landed missions", Proceedings of the Annual NASA Science and Technology Conference (NTSC), 2007, College Park, MD. USA [Online] [Retrieved from the Internet on Apr. 7, 2017]<URL: htmp//esto.nasa.gov/conferences/nstc2007/papers/di_kaichang_a6p2.pdf>.

Pesti, P. et al., "Low-Cost Orthographic imagery", Proceedings of the 16th ACM SIGSPATIAL International Conference on Advances in Geographic Information Systems, Article No. 24, Nov. 5-7, 2008, Irvine, California, USA.

Spookfish Innovations Pty Ltd; Response to Written Opinion regarding International App. No. PCT/AU2017/051143 Filed Jan. 18, 2019.

IP Australia; International Type Search for Provisional Patent Application regarding Australian Patent App. No. 2016904256, dated Apr. 10, 2017.

European Patent Office; Extended European Search Report including Supplementary European Search Report and European Search Opinion regarding European App. No. 17863045.5, dated Apr. 17, 2020.

Spookfish Innovations Pty Ltd; Response to Apr. 17, 2020 Extended European Search Report regarding European App. No. 17863045.5, dated Nov. 4, 2020.

Li et al., "Real-time Motion Tracking on a Cellphone using Inertial Sensing and a Rolling-Shutter Camera," 2013 IEEE International Conference on Robotics and Automation (ICRA), Karlsruhe, Germany, IEEE, pp. 4712-4719, May 6, 2013.

Cieslewski et al., "Point Cloud Descriptors for Place Recognition using Sparse Visual Information," 2016 IEEE International Conference on Robotics and Automation (ICRA), IEEE, pp. 4830-4836, May 16, 2016.

European Patent Office; Examination Report regarding European App. No. 17863045.5, dated Apr. 1, 2021.

Spookfish Innovations Pty Ltd; Response to First Examination Report regarding India Patent App. No. 201917015758, dated Jun. 1, 2022.

* cited by examiner

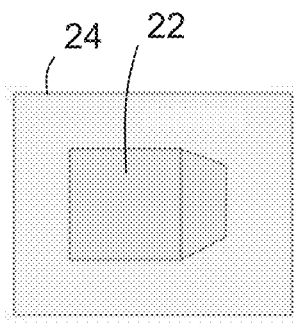
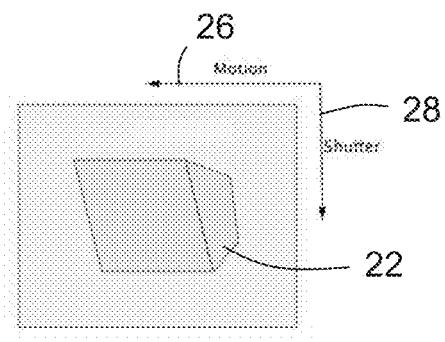
Fig. 3A          Fig. 3B
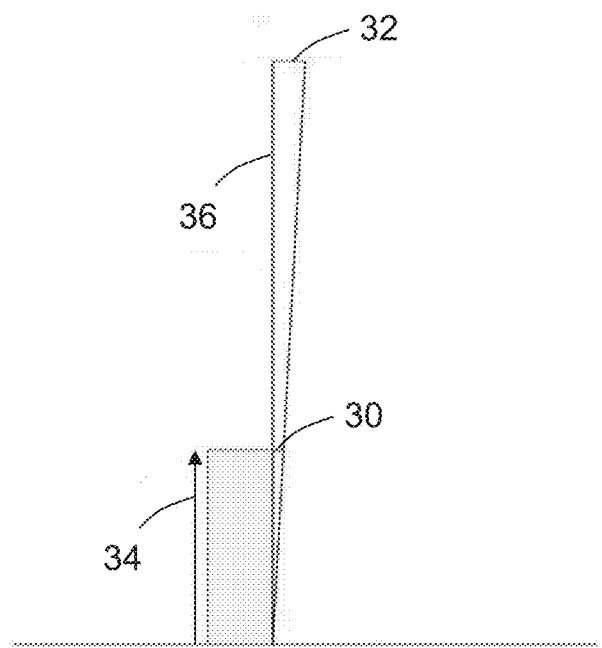
Fig. 4

IMAGE SYNTHESIS SYSTEM

CROSS-REFERENCE TO RELATED APPLICATIONS

This application is a continuation of, and claims priority to, U.S. patent application Ser. No. 16/343,610 filed on Apr. 19, 2019, titled "An Image Synthesis System", which is a U.S. national stage application filed under 35 U.S.C. § 371 of International Patent Application No. PCT/AU2017/051143 (Publication No. WO2018/071983), filed Oct. 20, 2017; which claims priority to Australian Provisional Patent Application No. AU2016904256, filed Oct. 20, 2016. The entire contents of the above-referenced patent applications are hereby expressly incorporated herein by reference.

BACKGROUND OF THE INVENTION

The present invention relates to an image synthesis system for use in an aerial survey system of the type that uses rolling shutter image sensors.

It is known to provide an aerial camera system that is arranged to capture ground images from a survey aircraft. Typically, as shown in FIG. 1, the aerial camera system 12 is mounted to an underside portion of the survey aircraft 10 and ground images are captured as the survey aircraft 10 moves along defined flight lines. The system is arranged to capture multiple images for each point on the ground, which enables a photogrammetric solution, typically a bundle adjustment process, to be applied to the captured images in order to determine a best case solution for interior and exterior orientation information associated with each camera used and the images captured by each camera. The solution produced by the bundle adjustment process may then be used to produce nadir and/or oblique photomaps.

In order to improve the photogrammetric solution produced by the bundle adjustment process, the number of images taken for each ground tie point feature must be increased, and typically this is achieved by capturing images more frequently so that the overlap between successively captured images is increased, and by ensuring that sufficient overlap exists between adjacent flight lines.

Productivity in relation to the ground area captured per hour at a defined resolution can potentially be increased by flying faster, flying higher and/or using a wider field of view (FoV).

However, such techniques typically cause image blur.

In order to improve image resolution, motion compensation techniques are employed, for example as described in applicant's International Patent Application No. PCT/AU2015/000606 (Publication No. WO2016/054681), the contents of which are hereby incorporated by reference in their entirety herein.

A typical survey aircraft includes one or more cameras for capturing images, and an Inertial Navigation System (INS) that is used to determine the movement, position and orientation of the survey aircraft and the position and pose (pointing direction) of the camera(s), typically using a GPS and an Inertial Measurement Unit (IMU) that uses accelerometers and gyroscopes for each spatial axis.

In a traditional aerial survey system, a camera model describes intrinsic (interior) and extrinsic (exterior) parameters of the camera(s). Intrinsic parameters include focal length, principal point, and radial distortion. Extrinsic parameters typically define the 3D position and pose of a camera for each frame, for example using six parameters (x, y and z absolute position parameters; and $\omega$, $\varphi$ and $\kappa$ rotational (pose) parameters). The six parameters for the frames captured during a survey are usually bundle adjusted as part of an aerial triangulation process in order to produce a refined solution for the parameters to an acceptable error threshold, typically using a reprojection error of 3D object space tie points and their corresponding observed features in image space.

Typically, an aerial camera system uses global shutter (GS) type CMOS or CCD sensors because the entire sensor is exposed at the same time. However, such global shutter sensors require significant circuitry that results in a reduction in the available area for light capture, have relatively low radiometric performance, and require relatively high power consumption, which ultimately reduces maximum frame rates and increases costs.

An alternative to global shutter type sensors, and by far the majority of imaging sensors currently in use, are electronic rolling shutter (RS)-type sensors due to lower cost and superior performance.

However, with a RS-type camera system under motion each frame does not have a single position and pose. Instead, each scanline potentially has a different position and pose, and therefore its own position and pose parameters.

Known techniques for performing a bundle adjustment process in a RS-type camera system include adjusting a small number of positions and poses in scanlines across each frame and interpolating for scanlines in between, and treating the rotation and velocity rates as constant and adjusting each frame in the time domain with a single additional parameter.

Rolling shutter (RS)-type sensors also result in image distortion when the sensor or object in the image frame is under motion during exposure, because different scanlines in the sensor are exposed at different times.

For example, as shown in FIGS. 2, 3A, and 3B, a rolling shutter-type sensor 18 includes multiple scanlines 20 that are exposed sequentially in rapid succession. If the sensor 18 is stationary during scanning, an object 22 in the produced image 24 appears normal, as shown in FIG. 3A. However, if the camera is moving, for example in a direction 26 transverse to the scanning direction 28, as shown in FIG. 3B, the object 22 appears distorted.

The distortion typically manifests in two ways.

Firstly, motion of the camera system during exposure of a frame will induce skew and wobble distortions, due to translation and rotation of the camera optical centre during rolling shutter readout. If the camera motion is accurately known, this type of distortion can be corrected easily, for example using a rubber-sheet transformation on the distorted image.

Secondly, if the scene is not flat, as with a typical real-world scene, a residual perspective error will remain due to a change in parallax during rolling shutter readout.

Consequently, RS-type sensors have not been used to any great extent in aerial survey camera systems.

BRIEF SUMMARY OF THE INVENTION

In accordance with a first aspect of the present invention, there is provided an image synthesis system for synthesizing a global shutter image based on a rolling shutter image, the rolling shutter image captured by a moving aerial camera system having at least one rolling shutter camera and the rolling shutter image having a plurality of scanlines, the scanlines having associated different position and pose information, the image synthesis system arranged to:

project a rolling shutter image captured by a rolling shutter camera:
  to object space by projecting each scanline of the rolling shutter image using position and pose information associated with the scanline,
  and subsequently from object space to a synthetic global shutter image.

In an embodiment, the position and pose information is derived from an inertial navigation system (INS).

In an embodiment, the system is arranged to:
  implement a bundle adjustment process on position and pose information derived from an inertial navigation system (INS) prior to projecting the rolling shutter images to object space; and
  use the bundle adjusted position and pose information to project the rolling shutter images to object space.

In an embodiment, the system is arranged to implement a bundle adjustment process on position and pose information associated with the synthetic global shutter images.

In an embodiment, the system is arranged to project a rolling shutter image to object space and subsequently to a synthetic global shutter image by ray tracing each pixel of the rolling shutter image from the rolling shutter image to object space and subsequently to the global shutter image.

In an embodiment, the system is arranged to:
  project a rolling shutter image to object space and subsequently to a synthetic global shutter image by projecting a subset of pixels of the rolling shutter image to object space and subsequently to the synthetic global shutter image; and
  interpolate between the pixels projected to the synthetic global shutter image to determine other pixels of the synthetic global shutter image.

In an embodiment, the system is arranged to project a rolling shutter image to object space and subsequently to a synthetic global shutter image by projecting the rolling shutter image onto a triangulated mesh representing a relevant portion of object space, and subsequently rendering to the global shutter image. The system may be arranged to use an elevation dataset to define 3D object space that includes information indicative of height of features across object space, and to project the rolling shutter image to the 3D object space. The elevation dataset may be obtained from an external data source.

In an embodiment, the system is arranged to select a position and pose for the synthetic global shutter image that corresponds to the position and pose of a principal ray of the rolling shutter image.

In an embodiment, the system is arranged to define multiple synthetic global shutter image portions based on the synthetic global shutter image, and to select a different position and pose for each synthetic global shutter image portion that reduces a residual perspective error for the synthetic global shutter image portion. The multiple synthetic global shutter image portions may be multiple synthetic global shutter image strips or tiles.

In an embodiment, the synthetic global shutter image portions overlap.

In an embodiment, the synthetic global shutter image portions do not overlap.

In an embodiment, the system is arranged to determine whether to define multiple synthetic global shutter image portions based on whether selection of a position and pose for the synthetic global shutter image that corresponds to the position and pose of a principal ray of the rolling shutter image would cause a defined amount of residual distortion in the synthetic global shutter image.

In an embodiment, the defined amount of residual distortion in the synthetic global shutter image is based on whether a defined scene depth exists, an aircraft velocity exists above a defined velocity, a capture altitude exists below a defined altitude, and/or a residual error is above a defined pixel threshold.

In accordance with a second aspect of the present invention, there is provided a method of synthesizing a global shutter image based on a rolling shutter image, the rolling shutter image captured by a moving aerial camera system having at least one rolling shutter camera and the rolling shutter image having a plurality of scanlines, each scanline having different associated position and pose information, the method comprising:
  projecting a rolling shutter image captured by a rolling shutter camera:
    to object space by projecting each scanline of the rolling shutter image using position and pose information associated with the scanline,
    and subsequently from object space to a synthetic global shutter image.

BRIEF DESCRIPTION OF SEVERAL VIEWS OF THE DRAWINGS

The present invention will now be described, by way of example only, with reference to the accompanying drawings, in which:

FIG. 3A is a produced image captured by a stationary rolling shutter-type sensor;

FIG. 3B is a produced image captured by a rolling shutter-type sensor moving in a direction transverse to the scanning direction FIG. 4 is a diagrammatic representation illustrating residual perspective error in an aerial camera system that includes a RS-type sensor;

DETAILED DESCRIPTION OF THE INVENTION

Figure 1:
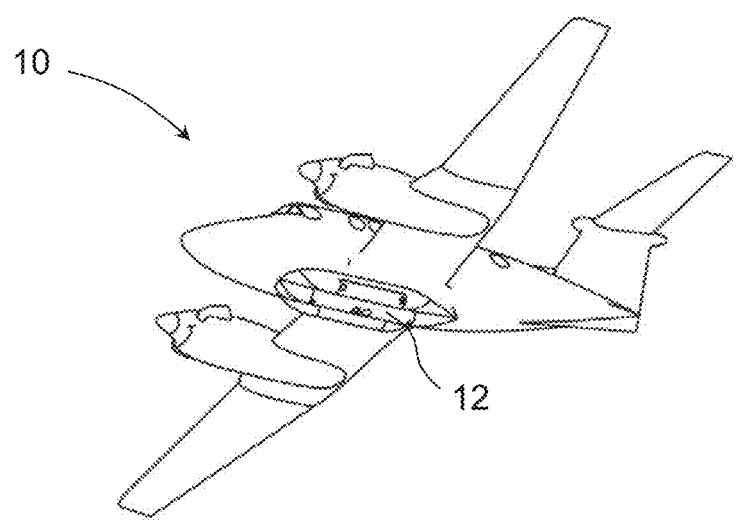
FIG. 1 is a diagrammatic representation of a survey aircraft incorporating an aerial camera system.

Referring to FIG. 1 of the drawings, a survey aircraft 10 with mounted aerial camera system 12 is shown.

Figure 2:
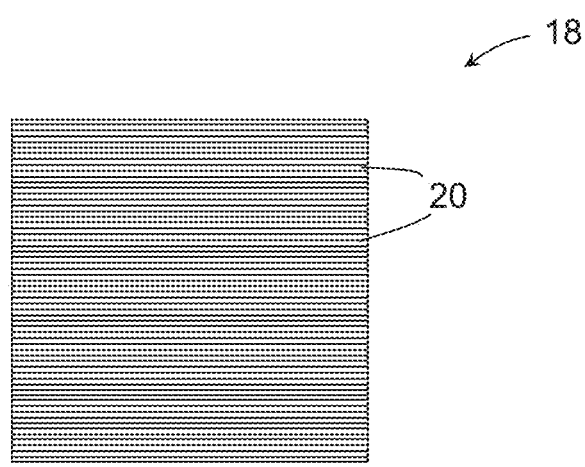
FIG. 2 is a diagrammatic representation of a rolling shutter type sensor.

The aerial camera system 12 in this example may include a stationary or movable camera assembly, for example arranged to rotate about a central longitudinal axis. The camera assembly includes at least one RS sensor 18 of the type shown in FIG. 2.

In this example, the lens assembly 30 has a focal length of about 376 mm, although other focal lengths are envisaged, such as 1800 mm.

In an example camera assembly wherein a camera captures images as the camera rotates about a central longitudinal axis, image compensation arrangements may be provided to compensate for forward and across track movement, for example as disclosed in International Patent Application No. PCT/AU2015/000606 (Publication No. WO2016/054681).

The camera system 12 is arranged such that the field of regard (FoR) is directed generally vertically downwards in order to capture images of the ground directly beneath the survey aircraft 10. In this example, the images are used to produce high resolution ortho imagery with approximately 70% forward and 2% side overlap between frames, and approximately 70% side overlap between the ground coverage footprints of adjacent flight lines.

This arrangement provides a relatively high redundancy for the images captured by the camera system 12.

The camera system 12 includes one or more rolling shutter (RS)-type sensors 18 and as such multiple scanlines of the sensor are exposed sequentially in rapid succession. Since the present camera assembly is moving during exposure of the scanlines, each scanline of the RS sensor 18 potentially has a different position and pose, and therefore its own position and pose parameters for bundle adjustment.

In order to provide data for use during bundle adjustment, the survey aircraft 10 also includes an Inertial Navigation System (INS), not shown, having a GPS unit and an Inertial Measurement Unit (IMU). The INS is arranged to determine the movement, position and orientation of the survey aircraft 10 in real time and thereby provide information usable to determine estimated camera positions and poses (pointing direction) for captured images/captured image scanlines in terms of x, y and z absolute position parameters and $\omega$, $\varphi$ and $\kappa$ rotational parameters.

Typically for a camera system that includes a RS-type sensor, skew and wobble distortions are produced due to translation and rotation of the camera optical centre during rolling shutter readout, and a residual perspective error is produced due to a change in parallax during rolling shutter read out.

With the present camera system of the type described in International Patent Application No. PCT/AU2015/000606 (Publication No. WO2016/054681), since compensation arrangements are provided to compensate for blur caused by forward and across track movement of the camera system, it is possible to improve survey efficiency by flying at relatively high altitude.

For high altitude, high resolution aerial surveying, the camera system is disposed at a relatively large distance from the object being imaged. As a consequence, the residual perspective error will be small for most captured images because the error is dependent on the ratio of the aircraft altitude to the depth of the scene being imaged.

As shown in FIG. 4, at nadir, the calculation of the residual perspective distortion error 30 is:

error=distance×depth/altitude where distance is the translation distance 32 of the camera system optical centre during exposure of a frame, depth is the depth 34 of the scene in object space, and altitude is the altitude 36 of the survey aircraft 10.

It can be seen that as the altitude 36 increases, the error 30 becomes smaller. For example, for a RS camera with a 10 ms rolling shutter time $T_{skew}$, 75 m/s aircraft velocity, 2,500 m altitude and a 100 m scene depth, the residual perspective distortion error is as follows:

distance=$T_{skew}$*v=0.01*75=0.75 m error=0.75*100/2,500=0.03 m

Therefore, for an image frame with a maximum scene depth 34 of 100 m, the maximum perspective error 30 from top to bottom of a frame will be 3 cm, which is a manageable error.

In real world conditions, the scene depth is generally much smaller than 100 m, with the main exception being scenes that include high-rise buildings and bridges.

Since the perspective error is manageable, the inventors have concluded that it is practicable to use RS-type sensors for high altitude aerial surveys.

However, since aerial surveys typically use contemporary software solutions that require global shutter images, the present system is arranged to produce synthetic global shutter images from RS-type image frames captured using RS sensors.

In order to create a synthetic GS image from a RS image, the present system is arranged to project the RS image to the ground then to a GS image.

Figure 5:
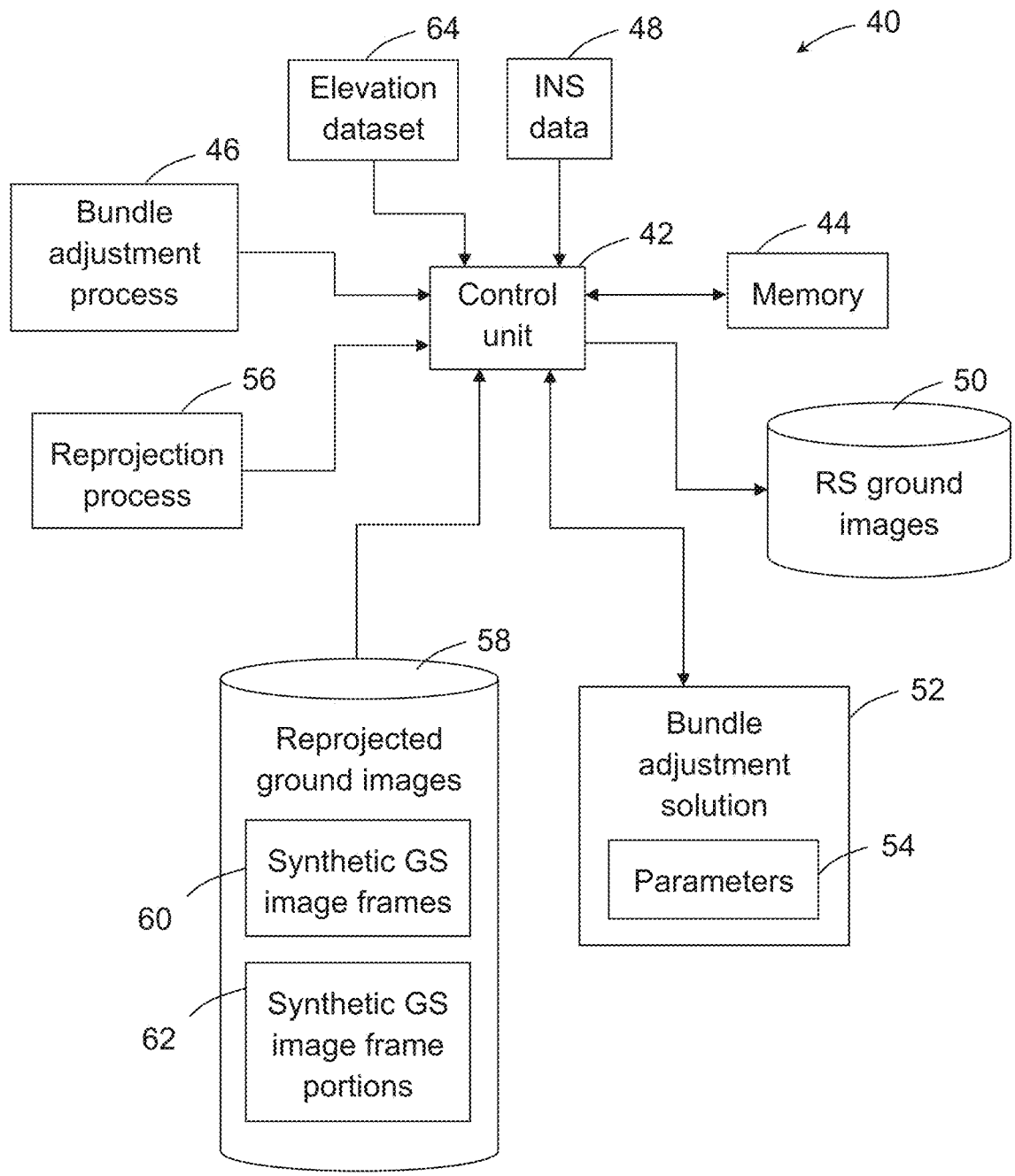
FIG. 5 is a block diagram illustrating operative components of an image synthesis system in accordance with an embodiment of the present invention.

Operative components of an image synthesis system 40 are shown in FIG. 5.

The system 40 includes a control unit 42 arranged to control and coordinate operations in the system 40 and a memory 44 arranged to load processes implemented by the control unit 42. In this example, the system 40 is implemented using a personal computer and as such the control unit may be implemented using a processor and associated programs. However, it will be understood that any suitable implementation is envisaged.

The system 40 in this example also implements a bundle adjustment process 46, data indicative of which is stored in a suitable data storage device, based on: inertial navigation system (INS) data 48 obtained from an inertial navigation system (INS), the INS data 48 indicative of a position and pose of a camera of the system during capture of each scanline of an image frame; and RS ground images 50 captured by one or more cameras.

The bundle adjustment process 46 produces a bundle adjustment solution 52 that includes parameters 54 associated with the INS data 48 and RS ground images 50 that represent a refined solution.

The system 40 is also arranged to implement a reprojection process 56, data indicative of which is stored in a suitable data storage device, whereby RS images are reprojected to ground and ultimately to synthetic GS image frames 60 and/or synthetic GS image frame portions 62, as described in more detail below. The reprojection process in this example is carried out by the control unit 42 and associated memory 44, for example by implementing suitable reprojection algorithms on the RS images.

Figure 6:
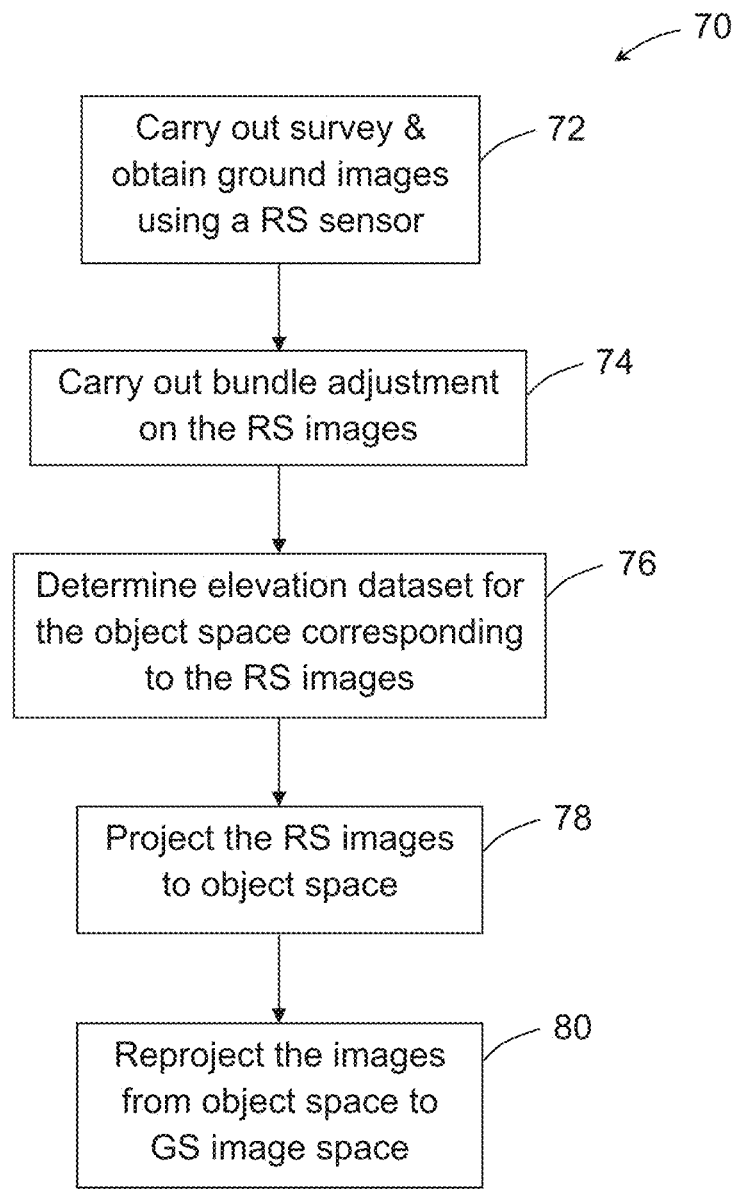
FIG. 6 is a flow diagram illustrating a method of carrying out an image synthesis process according to an embodiment of the present invention.

An example process for generating synthetic GS image frames from captured RS image frames will be described in relation to a flow diagram 70 shown in FIG. 6, and reprojection representation 90 illustrating reprojection of an image from RS image space to GS image space shown in FIG. 7.

In the present example, as shown at steps 72 and 74, after carrying out an aerial survey using a RS-type sensor, a bundle adjustment process is carried out in order to produce a suitable bundle adjustment solution for position and pose data for the RS image frames produced during the survey.

In this example, in order to produce a synthetic GS image 92 for an RS image 94 produced by the survey, the RS image is first projected (step 78) from RS image space to object space 95 (the ground), then subsequently reprojected (step 80) from object space to GS image space to produce the GS image 92.

Reprojection of an image from RS image space to GS image space in this way may be achieved in any suitable way, and in this example, this is done by ray tracing 1 pixel at a time from the RS image 94 to object space 95 and subsequently to the GS image 92. In the example illustrated in FIG. 7, a ray 93 is traced from a camera optical center 96 in RS image space through RS image pixel 97 to point 100 in object space 95, and subsequently from the point 100 to pixel 99 synthetic GS image space based on a selected synthetic camera optical center 102.

However, it will be understood that other equally applicable approaches exist, such as projecting a subset of source pixels from RS image space to object space and subsequently GS image space to obtain source pixel locations in the GS image space, and interpolating between them. Alternatively, texture projection could be used to project the entire RS image onto a triangulated mesh representing the ground, then rendering to the GS image.

In order to accurately project the RS image 94 to object space 95, height values for 3D points in object space corresponding to the projected RS image must be known. If the height is considered to be 0, which may be acceptable for relatively flat scenes, a significant projection error will result when the terrain deviates significantly from flat. In order to provide the height values, the present system uses, in step 76, an existing elevation dataset 64 associated with the scene in object space 95, the elevation dataset defining height values across a defined ground area. In the present example, the elevation dataset 64 may be obtained from an external data source such as the SRTM (Shuttle Radar Topography Mission).

By taking into account the height values derived from the elevation dataset 64, the system 40 can project the RS image 94 to 3D object space 95 while avoiding significant projection errors that may arise when the scene in object space significantly deviates from flat.

The position and pose data for individual scanlines 98 of the RS image 94 are also required to be known in order to project the RS image to object space 95. In this example, the position and pose data is obtained from a bundle adjustment process as part of a suitable aerial triangulation process. Alternatively, non-bundle adjusted position and pose data for the RS image is obtained for each scanline from an Inertial Navigation System (GPS+INS), accelerometers or other suitable measurement devices disposed on the survey aircraft 10.

Figure 7:
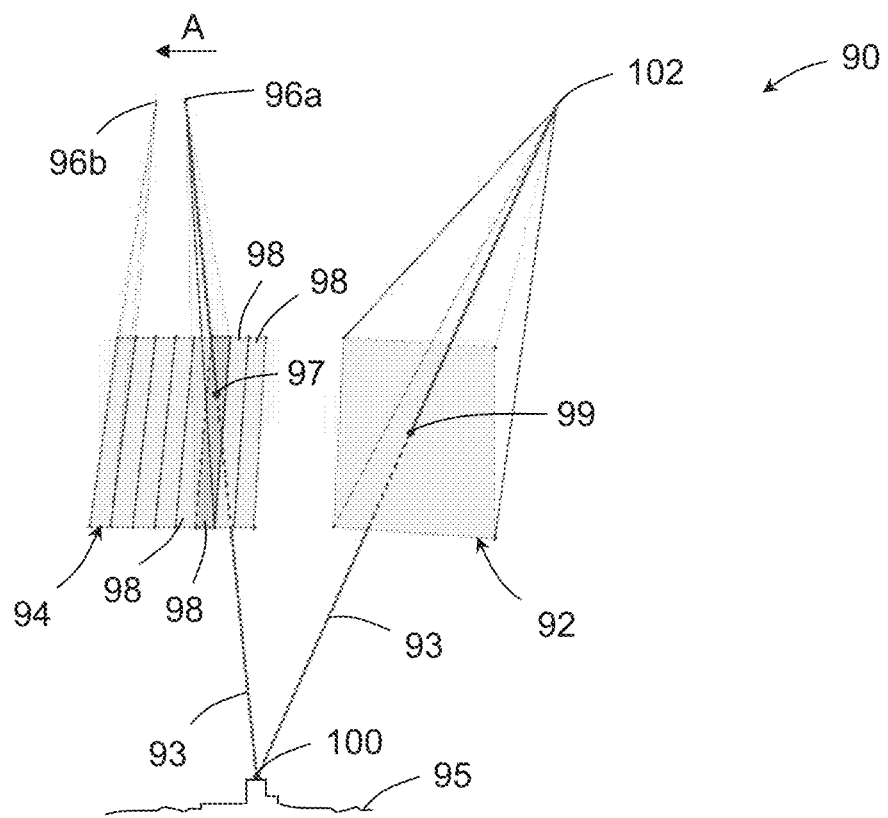
FIG. 7 is a diagrammatic representation illustrating reprojection of an image from RS image space to GS image space.

As shown in FIG. 7, each scanline 98 associated with the RS image 94 is projected in sequence to object space 95. Each scanline 98 has a different associated camera optical center 96 for ray projection, the position of the camera optical center for each scanline 98 being determined by the position of the camera when the scanline 98 was captured during the aerial survey. Accordingly, the camera optical center position 96 to use for projection moves successively, in this example in the direction of arrow A, in sequence with projection through the scanlines 98. In this way, a continuous projected image is recreated from image scanlines 98.

For image reprojection from object space 95 to GS image space, the system is arranged to use a suitable position and pose for the synthetic GS image 92 that is chosen to minimize projection errors. In this example, the position and pose for the GS image 92 is chosen as the position and pose of a principal ray of the rolling shutter image 94. This will result in the least amount of residual distortion in the synthetic GS image 92 near the center of the GS image 92.

If using the principal ray of the RS image 94 as a representative position and pose of the rolling shutter image causes excessive residual distortion in the GS image 92, for example because a large scene depth, much faster aircraft velocity, low altitude capture, or much higher resolution exists where the residual error becomes larger than a pre-determined threshold of a pixel, the synthetic GS image may be cut into a set of smaller GS image portions, for example GS image strips or tiles, which may or may not overlap. With this variation, each GS image portion is reprojected using a different optimal position and pose calculated from the equivalent part of the RS image. This reduces the residual perspective error as it reduces the effective distance moved during rolling shutter readout.

For example, cutting into 4 horizontal strips, each taking up 2.5 ms of an overall 10 ms $T_{skew}$:

$$\text{distance} = T_{skew} * v = 0.0025 * 75 = 0.1875 \text{ m}$$

$$\text{error} = 0.1875 * 100 / 2{,}500 = 0.0075 \text{ m } (7.5 \text{ mm})$$

As a result, whether to provide one GS image or multiple GS image portions, and the number of GS image portions, can be determined in order to meet the required accuracy of any further processing software requirements. Typically, a reprojection error of <0.5 pixels RMS will suffice for many applications such as dense surface model generation, however some processes, such as 3D Reconstruction, may require significantly better accuracy such as <0.3 pixels RMS.

While the above example is described in relation to an image synthesis system whereby bundle adjustment is first carried out in relation to captured GS image scanlines and the adjusted position and pose information used to project the RS image from RS image space to object space and subsequently GS image space, it will be understood that other variations are possible. For example, for a camera system wherein bundle adjustment in relation to the image scanlines would be overly complex and/or cumbersome, position and pose data from the survey aircraft INS may be used to project the image from RS image space to object space and subsequently GS image space, with bundle adjustment carried out after reprojection on position and pose data determined for the synthetic GS images.

Modifications and variations as would be apparent to a skilled addressee are deemed to be within the scope of the present invention.

The invention claimed is:

1. An image synthesis system for synthesizing a global shutter image based on a rolling shutter image, the image synthesis system arranged to:
   project a rolling shutter image captured by a rolling shutter camera in a moving aerial camera system, the rolling shutter image having a plurality of scanlines having associated different position and pose information, to a 3D object space, the 3D object space including information indicative of height of features in the 3D object space, by projecting each scanline of the rolling shutter image from a camera optical center determined for the scanline using the position and pose information associated with the scanline, each scanline having a different camera optical center, by ray tracing each pixel of the rolling shutter image from the rolling shutter image to the 3D object space; and
   project, subsequently, from the 3D object space to a synthetic global shutter image by ray tracing each pixel from the 3D object space to the synthetic global shutter image.

2. The image synthesis system of claim 1, wherein the position and pose information is derived from an inertial navigation system (INS).

3. The image synthesis system of claim 1, wherein the system is arranged to:
implement a bundle adjustment process on position and pose information derived from an inertial navigation system (INS) prior to projecting the rolling shutter image to 3D object space to create bundle adjusted position and pose information; and
use the bundle adjusted position and pose information to project the rolling shutter image to object space.

4. The image synthesis system of claim 1, wherein the system is arranged to implement a bundle adjustment process on position and pose information associated with the synthetic global shutter image.

5. The image synthesis system of claim 1, wherein the information indicative of height of features in the 3D object space is based on an elevation dataset obtained from an external data source.

6. The image synthesis system of claim 1, wherein the system is arranged to select a position and pose for the synthetic global shutter image that corresponds to the position and pose of a principal ray of the rolling shutter image.

7. An image synthesis system for synthesizing a global shutter image based on a rolling shutter image, the image synthesis system arranged to:
project a rolling shutter image captured by a rolling shutter camera in a moving aerial camera system, the rolling shutter image having a plurality of scanlines having associated different position and pose information, to a 3D object space, the 3D object space including information indicative of height of features in the 3D object space, by projecting each scanline of the rolling shutter image from a camera optical center determined for the scanline using the position and pose information associated with the scanline, each scanline having a different camera optical center;
project, subsequently, from the 3D object space to a synthetic global shutter image;
define multiple synthetic global shutter image portions based on the synthetic global shutter image; and,
select a different position and pose for each synthetic global shutter image portion that reduces a residual perspective error for the synthetic global shutter image portion.

8. The image synthesis system of claim 7, wherein the multiple synthetic global shutter image portions are multiple synthetic global shutter image strips or tiles.

9. The image synthesis system of claim 7, wherein the synthetic global shutter image portions overlap.

10. The image synthesis system of claim 7, wherein the synthetic global shutter image portions do not overlap.

11. The image synthesis system of claim 7, wherein the system is arranged to determine whether to define multiple synthetic global shutter image portions based on whether selection of a position and pose for the synthetic global shutter image that corresponds to the position and pose of a principal ray of the rolling shutter image would cause a defined amount of residual distortion in the synthetic global shutter image.

12. The image synthesis system of claim 11, wherein the defined amount of residual distortion in the synthetic global shutter image is based on whether a defined scene depth exists, an aircraft velocity exists above a defined velocity, a capture altitude exists below a defined altitude, and/or a residual distortion is above a defined pixel threshold.

13. An image synthesis system for synthesizing a global shutter image based on a rolling shutter image, the image synthesis system arranged to:
project a rolling shutter image captured by a rolling shutter camera in a moving aerial camera system, the rolling shutter image having a plurality of scanlines having associated different position and pose information, to a 3D object space, the 3D object space including information indicative of height of features in the 3D object space, by projecting each scanline of the rolling shutter image from a camera optical center determined for the scanline using the position and pose information associated with the scanline, each scanline having a different camera optical center, by projecting a subset of pixels of the rolling shutter image to the 3D object space;
project, subsequently, from the 3D object space to a synthetic global shutter image by projecting a subset of pixels from the 3D object space to the synthetic global shutter image; and
interpolate between the pixels projected to the synthetic global shutter image to determine other pixels of the synthetic global shutter image.

14. The image synthesis system of claim 13, wherein the position and pose information is derived from an inertial navigation system (INS).

15. The image synthesis system of claim 13, wherein the system is arranged to implement a bundle adjustment process on position and pose information associated with the synthetic global shutter image.

16. The image synthesis system of claim 13, wherein the information indicative of height of features in the 3D object space is based on an elevation dataset obtained from an external data source.

17. An image synthesis system for synthesizing a global shutter image based on a rolling shutter image, the image synthesis system arranged to:
project a rolling shutter image captured by a rolling shutter camera in a moving aerial camera system, the rolling shutter image having a plurality of scanlines having associated different position and pose information, to a 3D object space, the 3D object space including information indicative of height of features in the 3D object space, by projecting each scanline of the rolling shutter image from a camera optical center determined for the scanline using the position and pose information associated with the scanline, each scanline having a different camera optical center, by projecting the rolling shutter image onto a triangulated mesh representing a relevant portion of the 3D object space; and
project, subsequently, from the 3D object space to a synthetic global shutter image by rendering from the 3D object space to the synthetic global shutter image.

18. The image synthesis system of claim 17, wherein the position and pose information is derived from an inertial navigation system (INS).

19. The image synthesis system of claim 17, wherein the system is arranged to implement a bundle adjustment process on position and pose information associated with the synthetic global shutter image.

20. The image synthesis system of claim 17, wherein the information indicative of height of features in the 3D object space is based on an elevation dataset obtained from an external data source.

* * * * *